US010606376B2

(12) United States Patent
Chang et al.

(10) Patent No.: US 10,606,376 B2
(45) Date of Patent: Mar. 31, 2020

(54) RETRACTABLE STYLUS

(71) Applicant: Acer Incorporated, New Taipei (TW)

(72) Inventors: Kai-Lin Chang, New Taipei (TW); Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 201 days.

(21) Appl. No.: 15/849,644

(22) Filed: Dec. 20, 2017

(65) Prior Publication Data

US 2019/0064943 A1 Feb. 28, 2019

(30) Foreign Application Priority Data

Aug. 31, 2017 (TW) ............................. 106129828 A

(51) Int. Cl.
*G06F 3/0354* (2013.01)
*G06F 3/044* (2006.01)
*G06F 3/045* (2006.01)
*B43K 21/00* (2006.01)

(52) U.S. Cl.
CPC ........ *G06F 3/03545* (2013.01); *B43K 21/006* (2013.01); *G06F 3/044* (2013.01); *G06F 3/045* (2013.01)

(58) Field of Classification Search
CPC ...... G06F 3/033; G06F 3/03545; G06F 3/045; G06F 3/044; B43K 17/00; B43K 3/04; B43K 24/00–088; B43K 8/003; B43K 21/006

See application file for complete search history.

(56) References Cited

U.S. PATENT DOCUMENTS

| 3,709,620 | A | | 1/1973 | Miyamoto | |
|---|---|---|---|---|---|
| 5,889,512 | A | * | 3/1999 | Moller | G06F 3/03545 345/179 |
| 6,914,596 | B2 | * | 7/2005 | Liu | G06F 1/1626 178/19.01 |
| 7,077,594 | B1 | * | 7/2006 | Annerino | G06F 3/03545 401/258 |
| 2003/0077103 | A1 | * | 4/2003 | Kim | A45D 40/205 401/68 |

(Continued)

FOREIGN PATENT DOCUMENTS

| TW | M348282 | 1/2009 |
|---|---|---|
| TW | M357374 | 5/2009 |
| TW | M478864 | 5/2014 |

*Primary Examiner* — Temesghen Ghebretinsae
*Assistant Examiner* — Ivelisse Martinez Quiles
(74) *Attorney, Agent, or Firm* — JCIPRNET

(57) ABSTRACT

A stylus including a pen rod, a first pen barrel, a second pen barrel, a driving element, and an actuating element is provided. The first pen barrel has a first end portion, a second end portion, and a first engagement slot located at the second end portion. The first end portion is fixed to the pen rod. The second pen barrel is sleeved on the second end portion. The driving element is disposed in the first pen barrel and includes an engagement portion. The engagement portion is engaged with the first engagement slot. The actuating element passes through the second pen barrel and the first pen barrel and is coupled to the driving element. The actuating element is configured to move toward a first direction after receiving a force to cause the driving element to be elastically deformed to separate the engagement portion from the first engagement slot.

9 Claims, 6 Drawing Sheets

(56) References Cited

U.S. PATENT DOCUMENTS

| | | | |
|---|---|---|---|
| 2003/0184529 A1* | 10/2003 | Chien | G06F 1/1626 345/179 |
| 2007/0020037 A1* | 1/2007 | Liu | B43K 8/00 401/259 |
| 2007/0075987 A1* | 4/2007 | Liu | G06F 3/03545 345/179 |
| 2008/0170048 A1* | 7/2008 | Hua | G06F 3/03545 345/179 |
| 2011/0221710 A1* | 9/2011 | Liang | G06F 3/03545 345/179 |
| 2014/0255079 A1* | 9/2014 | Fisher, Jr. | B43K 24/00 401/115 |
| 2015/0084933 A1* | 3/2015 | Kinoshita | G06F 3/03545 345/179 |

\* cited by examiner

RETRACTABLE STYLUS

CROSS-REFERENCE TO RELATED APPLICATION

This application claims the priority benefit of Taiwan application serial no. 106129828, filed on Aug. 31, 2017. The entirety of the above-mentioned patent application is hereby incorporated by reference herein and made a part of this specification.

BACKGROUND

Field of the Invention

The invention relates to a stylus and more particularly, to a retractable stylus.

Description of Related Art

A general type electronic device, such as a tablet computer, a smart phone, a notebook computer or a post-of-sale (POS) terminal is commonly equipped with a touch screen, such that a user can choose to touch the touch screen by a finger or a stylus to operate the electronic device.

The common stylus has a fixed length, and in order to meet the design trend of miniaturization for electronic devices, a size of the stylus is also developed toward being compact for the user to carry the stylus easily or for the stylus to be accommodated in a reserved space of the electronic device. However, a miniaturized stylus is inconvenient for the user to hold and even may affect the user's smoothness in operation.

SUMMARY

The invention provides a stylus capable of improving flexibility in use and providing a user with preferable holding experience in operation.

A stylus of the invention includes a pen rod, a first pen barrel, a second pen barrel, a driving element and an actuating element. The first pen barrel has a first end portion, a second end portion opposite to the first end portion and a first engagement slot located at the second end portion. The first end portion is fixed to the pen rod. The second pen barrel is sleeved on the second end portion. The driving element is disposed in the first pen barrel and includes an engagement portion. The engagement portion is engaged with the first engagement slot. The actuating element passes through the second pen barrel and the first pen barrel and is coupled to the driving element. The actuating element is configured to move toward a first direction after receiving a force to cause the driving element to be elastically deformed to separate the engagement portion from the first engagement slot, such that the driving element drives the actuating element and the second pen barrel to move toward a second direction opposite to the first direction.

Based on the above, the stylus of the invention can extend an overall length thereof or return to its initial length in a pressing-actuation manner, thereby improving flexibility in use. Moreover, the user can adjust the overall length based on personal demands, so as to achieve preferable holding experience in operation.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
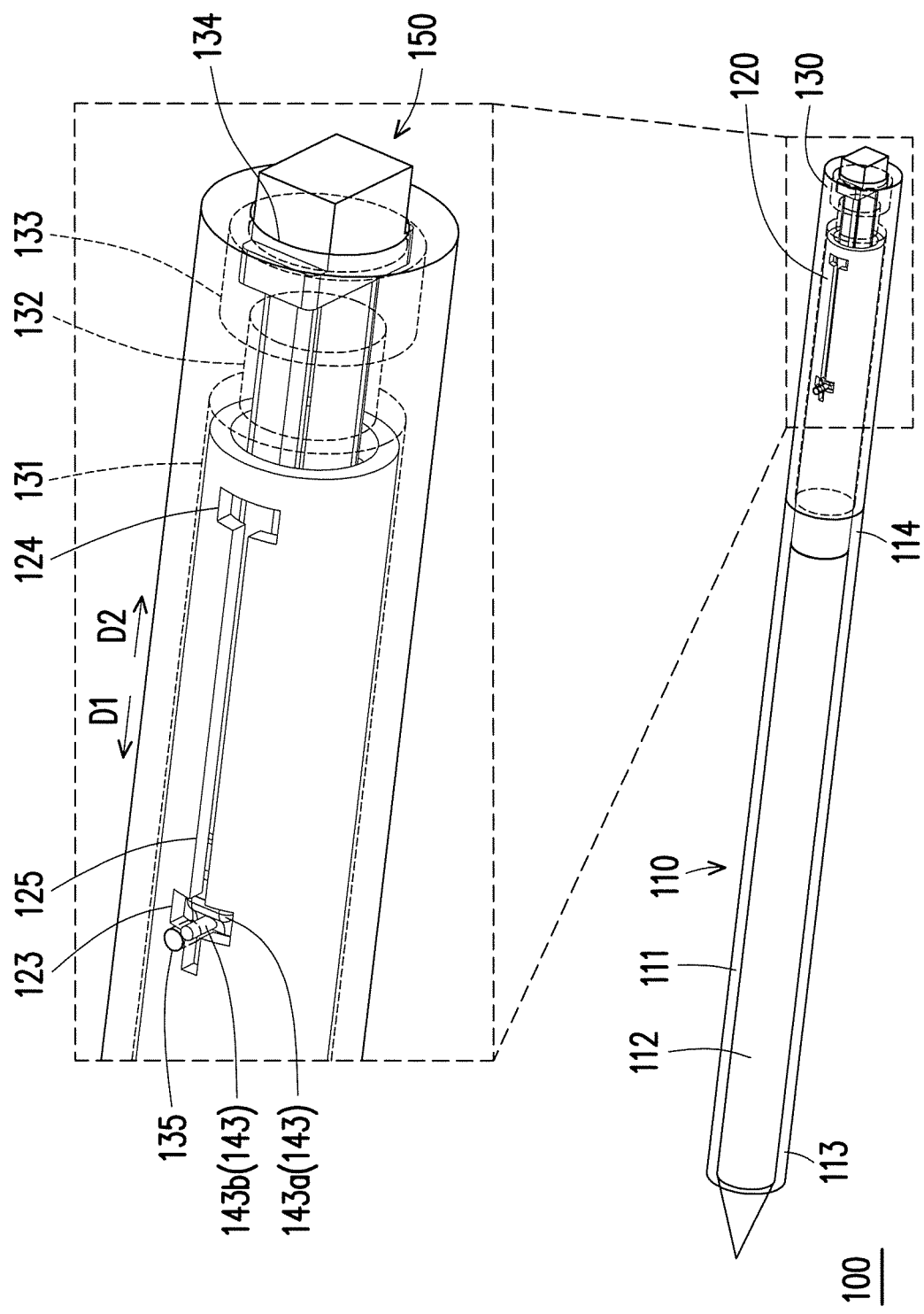
FIG. 1 is a schematic diagram illustrating a stylus according to an embodiment of the invention.
Figure 2:
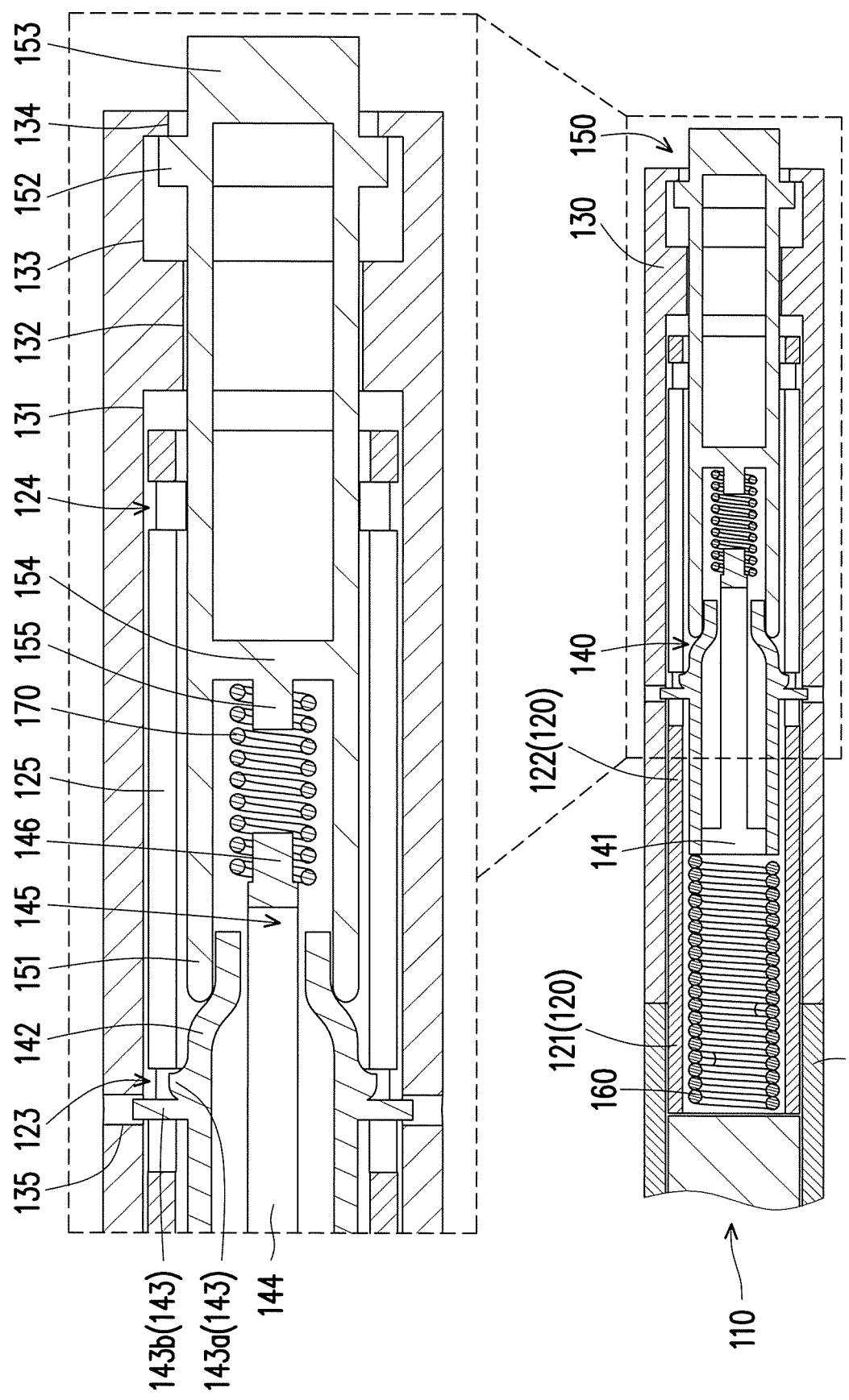
FIG. 2 is a schematic cross-sectional diagram illustrating a part of the stylus depicted in FIG. 1.

FIG. 1 is a schematic diagram illustrating a stylus according to an embodiment of the invention. FIG. 2 is a schematic cross-sectional diagram illustrating a part of the stylus depicted in FIG. 1. For the sake of clear illustration and descriptive convenience, in FIG. 1, a barrel body 111 and a second pen barrel 130 of a pen rod 110 are illustrated in a perspective manner, and an interior contour of a second pen barrel 130 is illustrated by dashed lines. Referring to FIG. 1 and FIG. 2, in the present embodiment, a stylus 100 may be a capacitive stylus or a resistive stylus, which is not particularly limited in the invention. The stylus 100 includes a pen rod 110, a first pen barrel 120, a second pen barrel 130, a driving element 140, an actuating element 150, a first elastic element 160 and a second elastic element 170.

To be specific, the pen rod 110 includes a barrel body 111 and a pen core 112. The pen core 112 passes through the barrel body 111, and the barrel body 111 has two opposite end portions 113 and 114. The pen core 112 is partially exposed from the end portion 113 to serve as a touch portion of the stylus 100 for touching a touch screen. The first pen barrel 120 has a first end portion 121, a second end portion 122 opposite to the first end portion 121 and a first engagement slot 123 located at the second end portion 122. The first end portion 121 passes through and is fixed to an end portion 114 of the pen rod 110, and the second pen barrel 130 is sleeved on the second end portion 122 (or referred to as that the second end portion 122 passes through the second pen barrel 130). The second pen barrel 130 keeps a degree of freedom for moving back and forth between the pen rod 110 and the first pen barrel 120, thereby abutting against the end portion 114 or moving away from the end portion 114, such that an overall length of the stylus 100 may be adjusted based on a user's personal demands to achieve preferable holding experience in operation.

In the present embodiment, the driving element 140 is disposed in the second end portion 122 of the first pen barrel 120, and two opposite end portions of the first elastic element 160 respectively abut against the pen rod 110 and the driving element 140. Specifically, the driving element 140 includes a main body 141, an elastic deformation portion 142 and an engagement portion 143. FIG. 2 exemplarily illustrates two symmetrically disposed elastic deformation portions 142, two symmetrically disposed engagement portions 143 and two symmetrically disposed first engagement slots 123, and a group consisting of one of the elastic deformation portions 142, one of the engagement portions 143 and one of the first engagement slots 123 is taken as an example for description.

Continuously referring to FIG. 1 and FIG. 2, the elastic deformation portion 142 is connected with the main body 141. The engagement portion 143 protrudes from an outer wall surface of the elastic deformation portion 142, and the engagement portion 143 is engaged with the first engagement slot 123. When the engagement portion 143 is engaged with first engagement slot 123, an end portion of the second pen barrel 130 abuts against the end portion 114 of the pen rod 110 (the first pen barrel 120 in this case is completely hidden in the barrel body 111 and the second pen barrel 130), and the overall length of the stylus 100 may be maintained at its initial length (i.e., a state as illustrated in FIG. 1), such that the stylus 100 may be easily carried by the user or accommodated in a reserved space of a corresponding electronic device. In addition, the engagement portion 143 may be separated from the first engagement slot 123 by elastic deformation of the elastic deformation portion 142, such that the driving element 140 may freely move in the first pen barrel 120 and drive the actuating element 150 and the second pen barrel 130, so as to achieve the purpose of adjusting the overall length of the stylus 100.

Specifically, the first elastic element 160 is disposed in the first pen barrel 120. The main body 141 of the driving element 140 abuts against an end portion of the first elastic element 160, and the other end portion of the first elastic element 160 abuts against the pen core 112 of the pen rod 110. In this circumstance, the first elastic element 160 is in a compressed state, and in the condition that the engagement portion 143 is engaged with the first engagement slot 123, the driving element 140 is incapable of moving relative to the first pen barrel 120. Thus, the elasticity saved by the first elastic element 160 is incapable of being released.

Specifically, the second pen barrel 130 also has a first space 131, a first through hole 132, a second space 133 and a second through hole 134 arranged in order toward a direction away from the pen rod 110. The first space 131 is configured to contain the second end portion 122 of the first pen barrel 120 and communicates with the internal space of the first pen barrel 120. The first through hole 132 communicates with the first space 131 and the second space 133, and the second through hole 134 communicates with the outside. The first through hole 132 and the second through hole 134 are respectively located at two opposite sides of the second space 133.

In the present embodiment, the actuating element 150 passes through the second pen barrel 130 and the first pen barrel 120 and coupled to the driving element 140 with a part located in the first pen barrel 120. The first elastic element 160 and the actuating element 150 are respectively located at two opposite sides of the driving element 140. Specifically, the actuating element 150 includes an actuating portion 151, a position-limiting portion 152 and a pressing portion 153. The actuating portion 151 and the pressing portion 153 are respectively located at two opposite sides of the position-limiting portion 152, and the position-limiting portion 152 is connected with the actuating portion 151 and the pressing portion 153. The actuating portion 151 passes through the second space 133, the first through hole 132 and the first space 131 and enters the first pen barrel 120 to abut against the elastic deformation portion 142. In other words, the pressing portion 153 and the elastic deformation portion 142 are respectively located at two opposite sides of the actuating portion 151. The position-limiting portion 152 is disposed in the second space 133, and as an outer diameter of the position-limiting portion 152 is greater than inner diameters of the first through hole 132 and the second through hole 134, the position-limiting portion 152 is limited from moving back and forth in the second space 133. The pressing portion 153 passes through the second through hole 134, and at least a part of the pressing portion 153 is exposed from the second through hole 134 for the user to press.

The second elastic element 170 is disposed in the first pen barrel 120, and two opposite end portions of the second elastic element 170 are respectively connected with the actuating element 150 and the driving element 140. Specifically, the actuating element 150 further includes a first connection portion 154 and a first positioning portion 155 located in the first pen barrel 120. As illustrated in FIG. 2, the actuating portion 151 may have a number of two, and the two actuating portions 151 may be symmetrically disposed at two opposite sides of the first connection portion 154. In addition, the first connection portion 154 is configured to connect with the two symmetrically disposed actuating portions 151, in which the first positioning portion 155 is connected with the first connection portion 154 and extends toward the driving element 140. It should be mentioned that FIG. 2 exemplarily illustrates the two symmetrically disposed actuating portions 151, but only one of the actuating portions 151 will be illustrated as an example for description below.

On the other hand, the driving element 140 further includes a second connection portion 144 and a second positioning portion 146. The second connection portion 144 is connected with the main body 141 and the second positioning portion 146, and the second connection portion 144 and the second positioning portion 146 are located between two elastic deformation portions 142 which are symmetrically disposed. The second connection portion 144 and the second positioning portion 146 are aligned to the first positioning portion 155 and extend toward the first positioning portion 155. The second connection portion 144 may be disposed with a receding space 145. When the elastic deformation portion 142 is elastically deformed by being pushed by the actuating portion 151, the elastic deformation portion 142 can move into the receding space 145.

As illustrated in FIG. 2, the first positioning portion 155 and the second positioning portion 146 are aligned to each other, and the two opposite end portions of the second elastic element 170 are respectively sleeved on the first positioning portion 155 and the second positioning portion 146. In other words, the first positioning portion 155 and the second positioning portion 146 respectively pass through the two opposite end portions of the second elastic element 170, and the second elastic element 170 is sleeved on an end portion of the first positioning portion 155, so as to abut against the first connection portion 154.

In the present embodiment, the engagement portion 143 includes a first engagement portion 143a and a second engagement portion 143b arranged side by side. The first engagement portion 143a is configured to fix relative positions of the driving element 140 and the first pen barrel 120, and the second engagement portion 143b is configured to fix relative positions of the second pen barrel 130 and the first pen barrel 120. In addition, the second end portion 122 of the first pen barrel 120 further has a second engagement slot 124, and the first engagement slot 123 is located between the pen rod 110 and the second engagement slot 124 (or referred to as that the first engagement slot 123 is located between the first end portion 121 and the second engagement slot 124). In other words, a distance between the second engagement slot 124 and the pen rod 110 is greater than a distance between the first engagement slot 123 and the pen rod 110. On the other hand, the first pen barrel 120 further has a sliding slot 125. The sliding slot 125 is configured to communicate with the first engagement slot 123 and the second engagement slot 124 which are opposite to each other, and the second engagement portion 143b may move back and forth along the sliding slot 125 between the first engagement slot 123 and the second engagement slot 124. On the other hand, the second pen barrel 130 further has a third engagement slot 135 for the second engagement portion 143b to enter. It should be mentioned that FIG. 2 exemplarily illustrates two symmetrically disposed second engagement slots 124, two symmetrically disposed third engagement slots 135 and two symmetrically disposed sliding slots 125, and a group consisting of one of the second engagement slots 124, one of the third engagement slots 135 and one of the sliding slots 125 is taken as an example for description.

As illustrated in FIG. 2, when the second pen barrel 130 abuts against the pen rod 110, the third engagement slot 135 is aligned to the first engagement slot 123. The first engagement portion 143a is engaged with the first engagement slot 123, and the second engagement portion 143b passes through the first engagement slot 123 to be engaged with the third engagement slot 135. In this circumstance, the driving element 140 is incapable of moving relative to the first pen barrel 120, and the second pen barrel 130 is incapable of moving relative to the first pen barrel 120, such that the overall length of the stylus 100 is maintained at the initiate length (i.e., the state as illustrated in FIG. 1).

Figure 3:
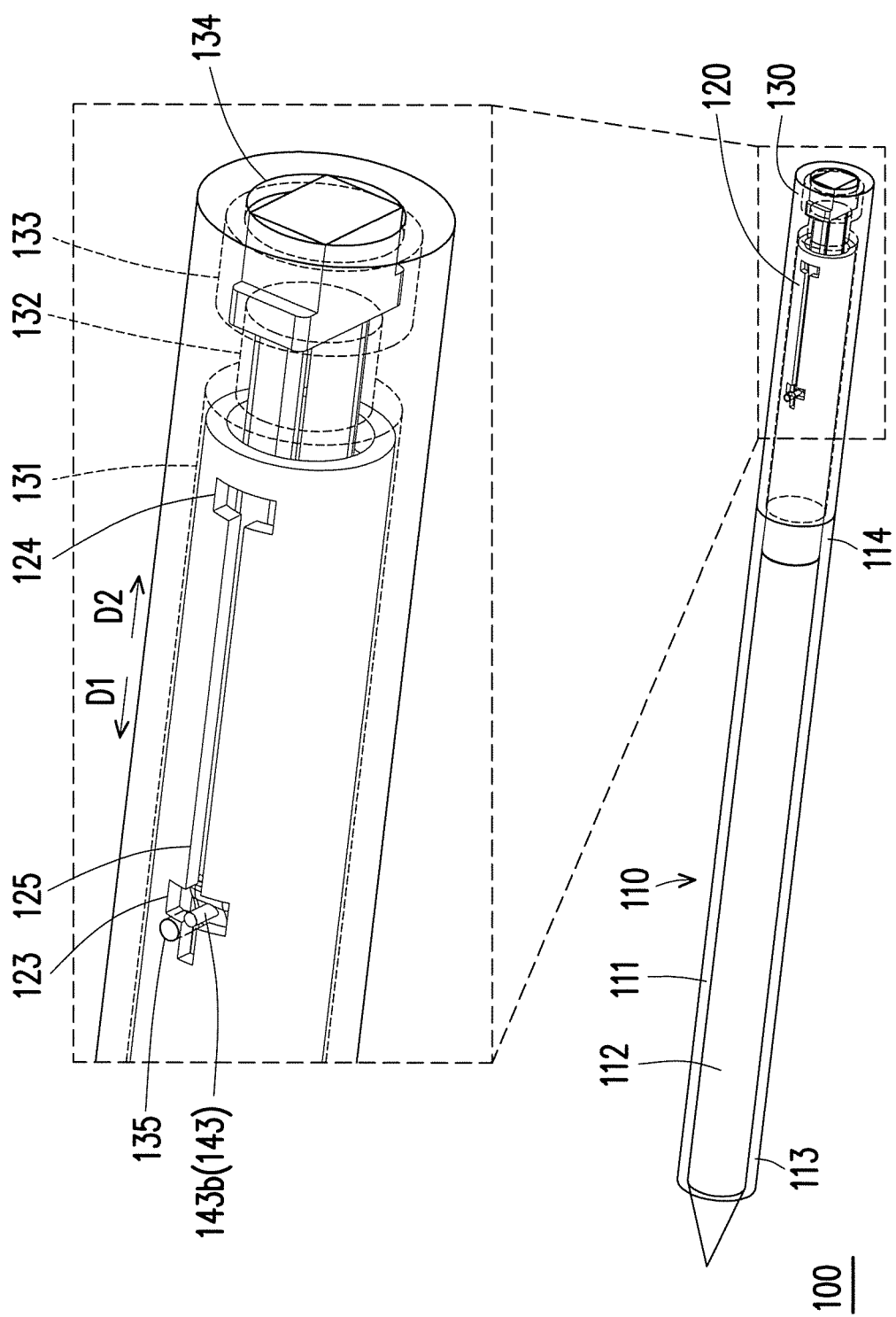
FIG. 3 is a schematic diagram illustrating a scenario after the actuating element of the stylus depicted in FIG. 1 is pressed by a force.
Figure 4:
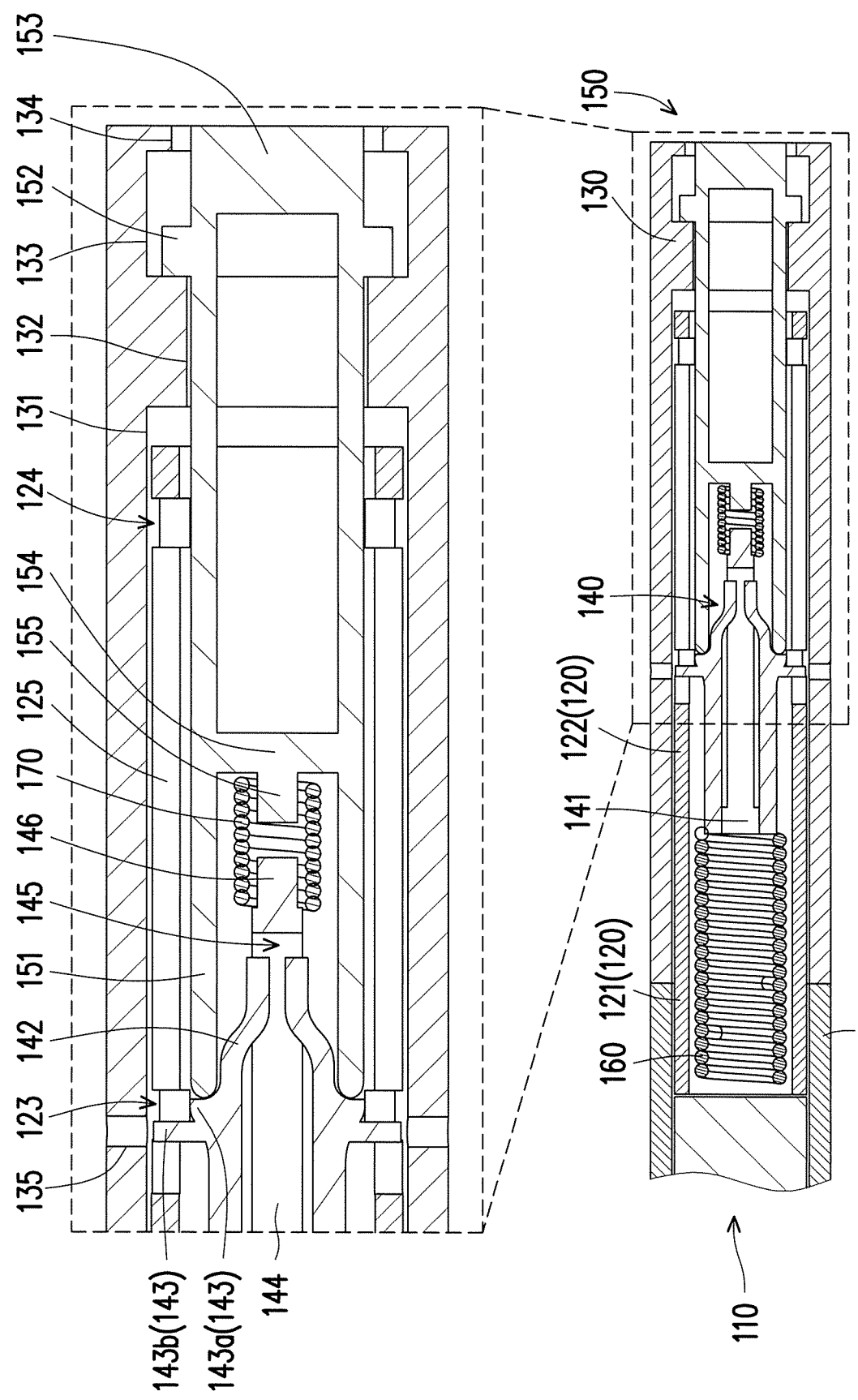
FIG. 4 is a schematic cross-sectional diagram illustrating a part of the stylus FIG. 3.
Figure 5:
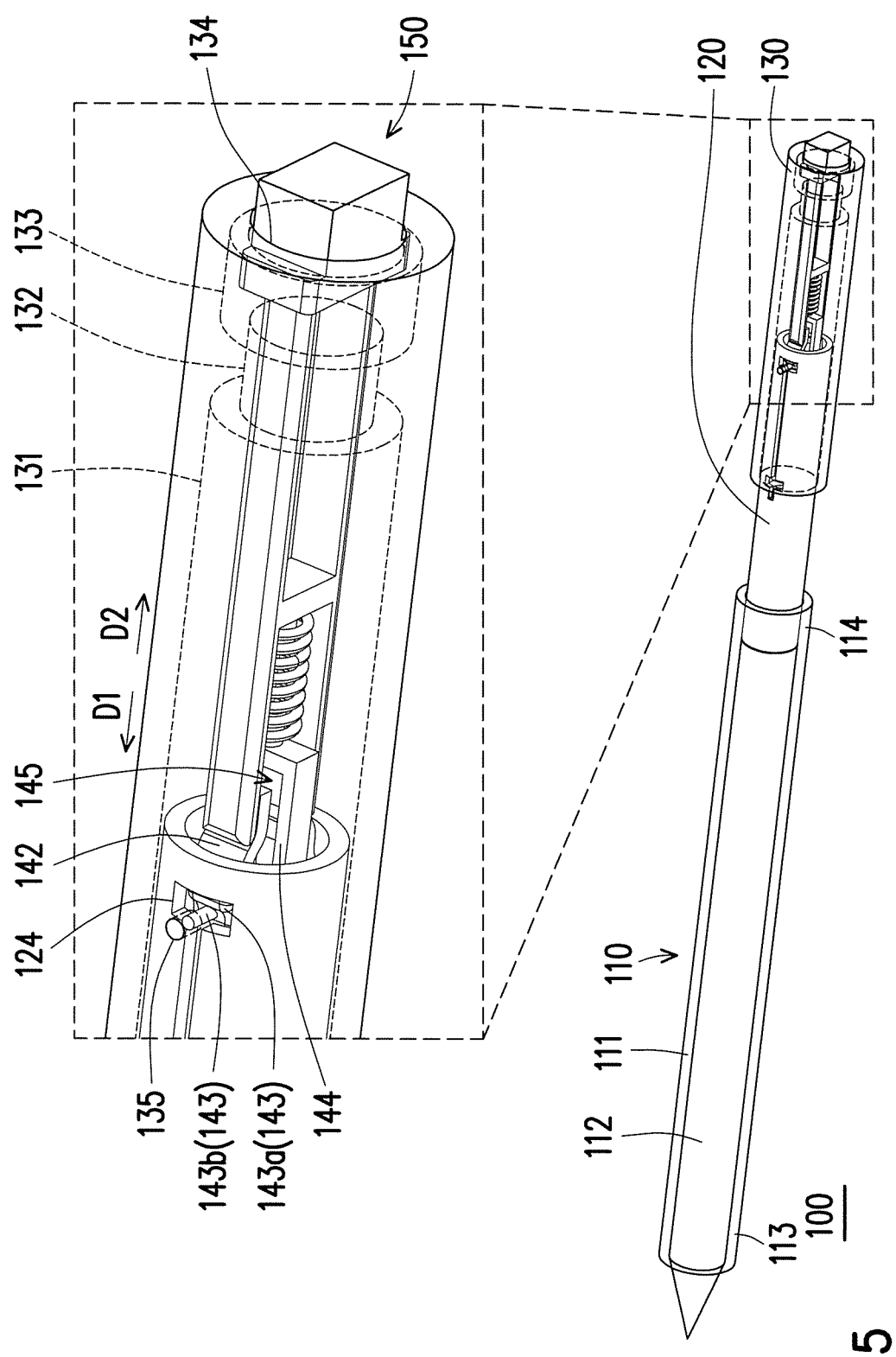
FIG. 5 is a schematic diagram illustrating a scenario after the second pen barrel of the stylus depicted in FIG. 3 moves toward the second direction.
Figure 6:
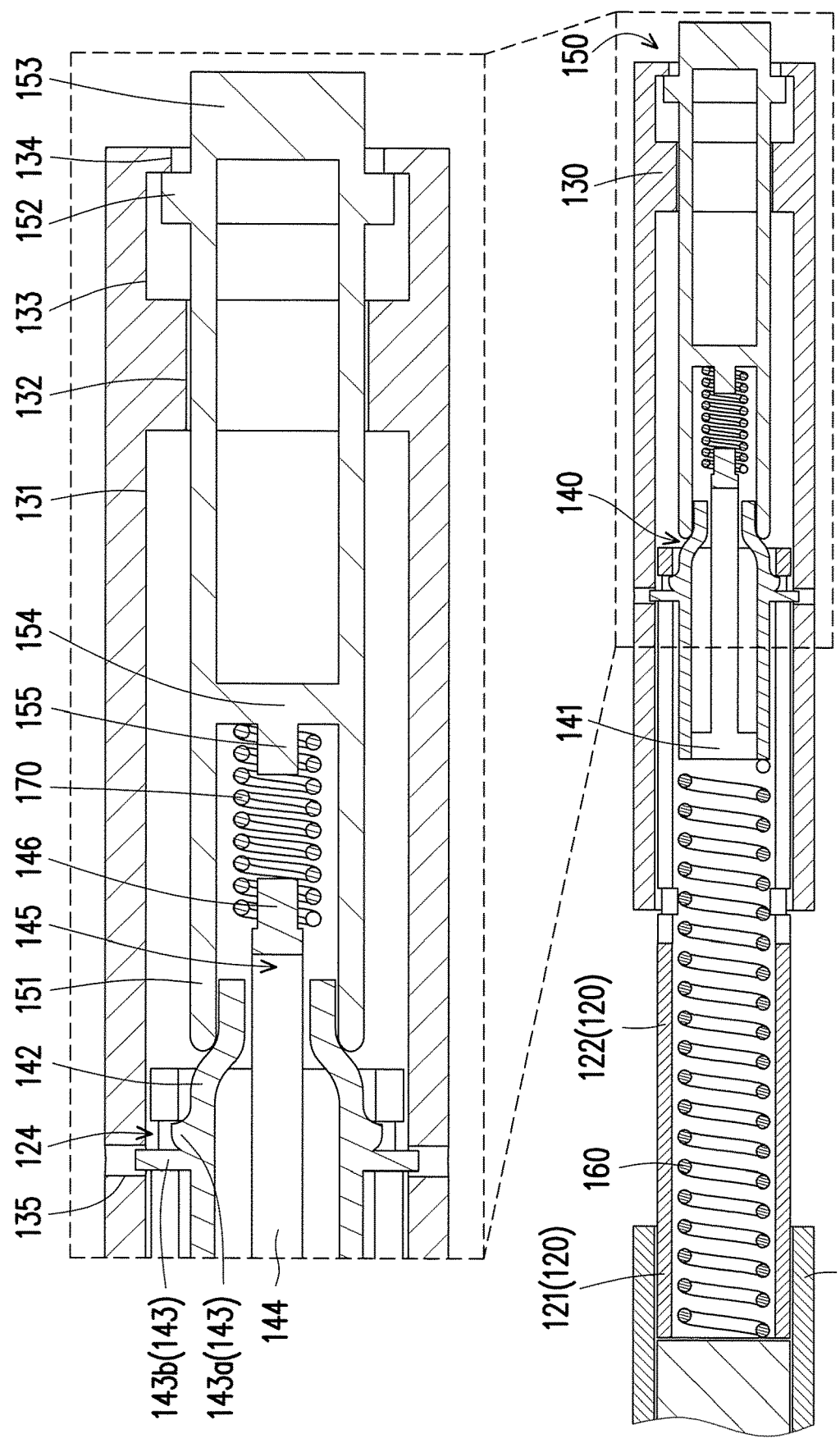
FIG. 6 is a schematic cross-sectional diagram illustrating a part of the stylus FIG. 5.

FIG. 3 is a schematic diagram illustrating a scenario after the actuating element of the stylus depicted in FIG. 1 is pressed by a force. FIG. 4 is a schematic cross-sectional diagram illustrating a part of the stylus FIG. 3. FIG. 5 is a schematic diagram illustrating a scenario after the second pen barrel of the stylus depicted in FIG. 3 moves toward the second direction. FIG. 6 is a schematic cross-sectional diagram illustrating a part of the stylus FIG. 5. For the sake of clear illustration and descriptive convenience, in FIG. 3 and FIG. 5, the barrel body 111 and the second pen barrel 130 of the pen rod 110 are illustrated in a perspective manner, and the interior contour of the second pen barrel 130 is illustrated by dashed lines.

Referring to FIG. 3 and FIG. 4, when the second pen barrel 130 abuts against the pen rod 110, and the overall length of the stylus 100 is maintained at the initiate length, the user may apply a force to press the pressing portion 153 of the actuating element 150, such that at least a part of the pressing portion 153 enters the second space 133, and the actuating element 150 moves toward a first direction D1 (or referred to as moving toward the pen rod 110). In this circumstance, the elastic deformation portion 142 is pushed by the actuating portion 151 to be elastically deformed, so as to separate the first engagement portion 143a from the first engagement slot 123 to release the structural interference between the driving element 140 and the first pen barrel 120. In the meantime, the second engagement portion 143b is also separated from the third engagement slot 135 to release the structural interference between the driving element 140 and the second pen barrel 130. During the process of the elastic deformation portion 142 being elastically deformed, at least a part of the elastic deformation portion 142 moves in the receding space 145, thereby successfully separating the first engagement portion 143a from the first engagement slot 123 and successfully separating the second engagement portion 143b from the third engagement slot 135.

Referring to FIG. 3 to FIG. 6, after the structural interference between the driving element 140 and the first pen barrel 120 is released, and the structural interference between the driving element 140 and the second pen barrel 130 is released, the elasticity saved by the first elastic element 160 is released so as to push the driving element 140 to move relative to the first pen barrel 120 toward a direction away from the pen rod 110 (or referred to as moving relative to the first pen barrel 120 toward a second direction D2 opposite to the first direction D1). In the meantime, the actuating element 150 and the second pen barrel 130 are driven by the driving element 140 to move toward the second direction D2. During the process of the driving element 140, the actuating element 150 and the second pen barrel 130 moving relative to the first pen barrel 120 toward the second direction D2, the second engagement portion 143b moves into the sliding slot 125 from the first engagement slot 123 and passes through the second engagement slot 124 after moving through the sliding slot 125, so as to be engaged with the third engagement slot 135 aligned to the second engagement slot 124. In the meantime, the first engagement portion 143a moves from where the first engagement slot 123 is located toward where the second engagement slot 124 is located, so as to be engaged with the second engagement slot 124.

It is to be specially mentioned that when the actuating element 150 moves toward the first direction D1 and abuts against the first engagement portion 143a with its actuating portion 151, the actuating element 150 stops moving relative to the first pen barrel 120 and the second pen barrel 130. On the other hand, as the position-limiting portion 152 of the actuating element 150 is only allowed to move back and forth only in the second space 13, a movement stroke of the position-limiting portion 152 in the second space 133 may be employed to determine a movement stroke of the actuating element 150 relative to the second pen barrel 130.

As illustrated in FIG. 3 and FIG. 4, when the actuating portion 151 abuts against the first engagement portion 143a, the second elastic element 170 is pushed by the first connection portion 154 to be compressively deformed and elastically deformed. Otherwise, when the force applied to the pressing portion 153 is removed, an elastic potential energy saved by the second elastic element 170 in the compression state is released to push the actuating element 150 to move relative to the second pen barrel 130 toward the second direction D2, such that the actuating portion 151 is separated from the first engagement portion 143a, and at least a part of the pressing portion 153 moves out of the second pen barrel 130 from the second through hole 134, as illustrated in FIG. 5 and FIG. 6.

In addition, after the structural interference between the driving element 140 and the first pen barrel 120 is released, and the structural interference between the driving element 140 and the second pen barrel 130 is released, the pen rod 110 and the first pen barrel 120 are fixed firmly. Additionally, after the force applied to the pressing portion 153 is removed, the position-limiting portion 152 moves from an inner wall of the second space 133 which is connected with the first through hole 132 to another inner wall of the second space 133 which is connected with the second through hole 134 and abuts against another inner wall surface of the second through hole 134 which is connected with the second space 133. Thereby, when the actuating element 150 is pushed by the driving element 140 to move toward the second direction D2, the second pen barrel 130 is synchronously driven by the actuating element 150 to move relative to the first pen barrel 120, such that the third engagement slot 135 move away from the first engagement slot 123 (or referred to as moving where the second engagement slot 124 is located), until a length of the first elastic element 160 returns to an initiate length before it is compressively deformed, the actuating element 150 stops moving relative to the first pen barrel 120, and the third engagement slot 135 is aligned to the second engagement slot 124. The second engagement portion 143b passes through the second engagement slot 124 to be engaged with the third engagement slot 135 while the third engagement slot 135 is aligned to the second engagement slot 124, so as to fix the relative positions of the second pen barrel 130 and the first pen barrel 120. Additionally, the first engagement portion 143a is engaged with the second engagement slot 124, so as to fix the relative positions of the driving element 140 and the first pen barrel 120.

As illustrated in FIG. 6, in the stylus 100, the second pen barrel 130 and the pen rod 110 which previously abut against with each other are separated from each other by the second pen barrel 130 moving relative to the pen rod 110 and the first pen barrel 120, such that the overall length of the stylus 100 is extended, and the stylus 100 is fixed in the state as illustrated in FIG. 6 with the structural interference between the driving element 140 and the second pen barrel 130 and the structural interference between the driving element 140 and the first pen barrel 120. In this circumstance, a part of the first pen barrel 120 is exposed between the pen rod 110 and the second pen barrel 130. The stylus 100 with the overall length being extended can provide the user with better holding experience. By contrast, the user may apply a force to press the pressing portion 153 toward the first direction D1 to push the second pen barrel 130 to move relative to the first pen barrel 120 toward the first direction D1, such that the stylus 100 returns to the state as illustrated in FIG. 1 and FIG. 2.

In light of the foregoing, in the stylus of the invention, the structural interference between the driving element and the first pen barrel and the structural interference between the driving element and the second pen barrel can be released by means of the pressing-actuation manner, such that the actuating element can be pushed by the first elastic element to move relative to the first pen barrel and drive the second pen barrel to move relative to the first pen barrel, thereby extending the overall length of the stylus. By contrast, the user can make the overall length of the stylus return to the initiate length by means of the pressing-actuation manner. Thus, the stylus of the invention can be more flexible in operation. Moreover, the user can adjust the overall length of the stylus based on personal demands, so as to obtain better holding experience in operation.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A retractable stylus, comprising:
 a pen rod;
 a first pen barrel, having a first end portion, a second end portion opposite to the first end portion and a first engagement slot located at the second end portion, and the first end portion being fixed to the pen rod;
 a second pen barrel, sleeved on the second end portion;
 a driving element, disposed in the first pen barrel and comprising an engagement portion, wherein the engagement portion is engaged with the first engagement slot;
 a first elastic element, disposed between the driving element and the pen rod, wherein the first elastic element is in a compressed state when the engagement portion is engaged in the first engagement slot; and
 an actuating element, passing through the second pen barrel and the first pen barrel and coupled to the driving element, wherein the first elastic element and the actuating element are respectively located at two opposite sides of the driving element, wherein the actuating element is configured to move toward a first direction after receiving a force to cause the driving element to be elastically deformed to separate the engagement portion from the first engagement slot to release an elasticity saved by the first elastic element in the compressed state to push the driving element, such that the driving element drives the actuating element and the second pen barrel to move toward a second direction opposite to the first direction.

2. The retractable stylus according to claim 1, wherein the driving element further comprises an elastic deformation portion coupled to the actuating element, the engagement portion protrudes from the elastic deformation portion, the elastic deformation portion is configured to be pushed by the actuating element to be elastically deformed, so as to separate the engagement portion from the first engagement slot.

3. The retractable stylus according to claim 2, wherein the actuating element comprises:
 an actuating portion, located in the first pen barrel and coupled to the elastic deformation portion; and
 a pressing portion, connected with the actuating portion, wherein at least a part of the pressing portion is exposed from the second pen barrel, and the pressing portion and the elastic deformation portion are respectively located at two opposite sides of the actuating portion.

4. The retractable stylus according to claim 3, further comprising:
 a second elastic element, disposed in the first pen barrel and connected with the actuating element and the driving element.

5. The retractable stylus according to claim 4, wherein the actuating element further comprises a first positioning portion located in the first pen barrel, the first positioning portion is located beside the actuating portion and extends toward the driving element, the driving element further comprises a second positioning portion, the second positioning portion is located beside the elastic deformation portion and extends toward the first positioning portion, and two opposite end portions of the second elastic element are respectively sleeved on the first positioning portion and the second positioning portion.

6. The retractable stylus according to claim 3, wherein the actuating element further comprises a position-limiting portion connected with the pressing portion and the actuating portion, the second pen barrel further comprises a first space, a first through hole, a second space and a second through hole, the first space is configured to contain the second end portion of the first pen barrel, the first through hole communicates with the first space and the second space, the second through hole communicates with the second space, the first through hole and the second through hole are respectively located at two opposite sides of the second space, the position-limiting portion is configured to move back and forth in the second space, and the pressing portion passes through the second through hole.

7. The retractable stylus according to claim 1, wherein the first pen barrel further has a second engagement slot located at the second end portion, the first engagement slot is located between the first end portion and the second engagement slot, and after the driving element drives the actuating element and the second pen barrel to move along the second direction, the engagement portion is engaged in the second engagement slot.

8. The retractable stylus according to claim 7, wherein the second pen barrel has a third engagement slot aligned to the first engagement slot, the engagement portion comprises a first engagement portion and a second engagement portion which are arranged side by side, the first engagement portion is engaged with the first engagement slot, the second engagement portion passes through the first engagement slot to be engaged with the third engagement slot, after the driving element is elastically deformed, the first engagement portion is separated from the first engagement slot, and the second engagement portion is separated from the third engagement slot, such that the driving element drives the actuating element and the second pen barrel to move along the second direction, and when the first engagement portion is engaged in the second engagement slot, the third engagement slot is aligned to the second engagement slot, such that the second engagement portion passes through the second engagement slot to be engaged with the third engagement slot.

9. The retractable stylus according to claim 8, wherein the first pen barrel further has a sliding slot communicating with the first engagement slot and the second engagement slot, the sliding slot is configured to allow the second engagement portion to move back and forth between the first engagement slot and the second engagement slot.

* * * * *